United States Patent [19]

Wassermann et al.

[11] 4,010,247

[45] Mar. 1, 1977

[54] METHOD FOR MAKING WATER DISPERSIBLE ALUMINUM HYDROXIDE

[75] Inventors: Martin Wilhelm Wassermann, Hamburg; Arnold Wilhelm Meyer, St. Michaelisdonn, both of Germany

[73] Assignee: CONDEA Petrochemie-Gesellschaft m.b.H., Brunsbuettel, Germany

[22] Filed: Feb. 10, 1975

[21] Appl. No.: 548,804

[30] Foreign Application Priority Data

Feb. 21, 1974 Germany ............................ 2408233

[52] U.S. Cl. ............................... 423/626; 423/629; 423/630; 423/631

[51] Int. Cl.² ............................................ C01F 7/02

[58] Field of Search .......... 423/626, 629, 630, 625, 423/631

[56] References Cited

UNITED STATES PATENTS

| | | | |
|---|---|---|---|
| 2,377,547 | 6/1945 | Fuchs | 423/626 |
| 3,207,578 | 9/1965 | Brown et al. | 423/626 |
| 3,262,754 | 7/1966 | Lindsay et al. | 423/625 |
| 3,385,663 | 5/1968 | Hughes | 423/626 |
| 3,411,876 | 11/1968 | Michel et al. | 423/626 |
| 3,411,877 | 11/1968 | Michel et al. | 423/626 |
| 3,653,937 | 4/1972 | Koenig et al. | 423/625 |
| 3,743,709 | 7/1973 | Shaw et al. | 423/630 |
| 3,839,536 | 10/1974 | Sato et al. | 423/630 |
| 3,907,982 | 9/1975 | Leach | 423/630 |

FOREIGN PATENTS OR APPLICATIONS

| | | | |
|---|---|---|---|
| 562,372 | 8/1958 | Canada | 423/628 |
| 678,220 | 1/1964 | Canada | 423/625 |
| 6,407,784 | 1/1965 | Netherlands | 423/626 |
| 1,062,124 | 3/1967 | United Kingdom | 423/629 |

*Primary Examiner*—Herbert T. Carter
*Attorney, Agent, or Firm*—Cushman, Darby & Cushman

[57] ABSTRACT

Water dispersible aluminum hydroxide is prepared by treating an acid dispersible aluminum hydroxide with 1 to 9 weight % of a gaseous acid.

15 Claims, No Drawings

METHOD FOR MAKING WATER DISPERSIBLE ALUMINUM HYDROXIDE

Aluminiumhydroxide is used, for instance, for coating supports for exhaust catalysts, as an anti-slip agent in the field of paper manufacture and in the plastics industry, as an antistatic agent in the textile industry, as a binding agent in the ceramic industry or for removing resins in the manufacture of cellulose. Aluminiumhydroxide is a very fine light pulverized material and should be present for the above-mentioned and other uses in an easy-to-handle form; namely as a dispersion in a carrier liquid.

It is known to disperse aluminumhydroxide in oily carrier liquids, by using surface active agents, such as alkyl aryl sulphonates. However these oily dispersions are unsuitable for the above-mentioned and other purposes, because of both the presence of oily substances and because of the presence of the surfactant, besides the use of such oily dispersions is uneconomical.

It is further known to disperse aluminiumhydroxide in weak acids. The preparation of these dispersions is uneconomical and impractical because at the place of charging by the worker there has to be prepared a weak acid solution and there must be added the correspondingly precisely measured amount of aluminiumhydroxide and there must be thorough mixing of aluminiumhydroxide into the dilute acid. Furthermore, the use of such dispersions is in many cases disadvantageous because of the presence of the acid. For this reason it was aimed to prepare aluminiumhydroxide which can be dispersed in pure or neutral water.

For the preparation of such water dispersible aluminum hydroxide up to now it has been proposed to disperse acid dispersible aluminiumhydroxide in slightly acidic water by using customary tanks equipped with a stirrer. The dispersions made in this way are then concentrated or concentrated by evaporation of the water, in order to then again disperse the concentrates in water at the charging place. This method of evaporation to obtain concentrates which may be later redispersed in water at the charging place by use of a stirrer is also uneconomical.

The object of the present invention is, therefore, to propose a simple and economical method for preparing aluminiumhydroxide which can be dispersed in water, which does not have the above-mentioned disadvantages, and in which a product is obtained which can be dispersed practically up to 99% without any difficulties and which yields highly concentrated, for instance, up to a 30% dispersion of aluminium oxide.

To solve this problem the invention provides a method by which an acid dispersible aluminiumhydroxide is treated with a gaseous acid up to an addition concentration of from 1 to 9 weight % and preferably 3 to 5% by weight of acid. Preferably, the addition of acid is effected in a fluidized bed or in a moving bed, or discontinuously in a simple container with a stirrer.

All inorganic or organic gaseous acids can be used which are gaseous at the working temperature. The temperature is not critical and is usually room temperature but can be varied widely. Thus when acetic acid is used the temperature should be above 118° C. There are also included as gaseous acids gaseous acid formers which lead to acid addition under the reaction conditions, for instance, $NO_2$ or $NO_2/N_2O_4$-mixtures. Especially suitable and economical are hydrogen chloride, nitric acid and acetic acid. Other acids which can be used are hydrogen bromide, sulfurdioxide, sulfur trioxide, hydrogen fluoride, formic acid. The gaseous acid is brought into contact with the aluminiumhydroxide for such a period of time or in such amount until the optimum concentration of addition for the particular acid is achieved, whereby it is unimportant whether a small amount is present for a long period of time or whether a large amount is used for the treatment during a short period of time.

Preferably the acid dispersible aluminiumhydrate is treated with HCl up to an addition concentration of 1.8 to 4.5% by weight most preferably at least 2.3% and with $NO_2$ up to an addition concentration of 2.5 to 4.5% by weight.

Surprisingly, it has been found that aluminiumhydrate pre-treated in a simple manner in this way has a dispersibility of at least 97% based on the total amount of aluminiumhydroxide added, namely, for dispersion having a solids content of up to 30%. The powder obtained according to the process of the invention can be stirred into water without any difficulties and almost immediately forms an excellent usable dispersion.

It is critical that the addition concentration of acid be maintained because the dispersibility decreases considerably when working with a lower addition concentration, while at an addition concentration above the given value a gel is formed immediately upon dispersion of the material in water.

Surprisingly, however, it has been found, further, that if aluminium hydroxide is treated with an excess of gaseous acid beyond the desired addition concentration it can be mixed with untreated aluminiumhydroxide until the desired value of the acid addition concentration is again achieved, and that this mixed product again shows an excellent dispersibility. This additional knowledge makes possible a greater certainty in the preparation of water-dispersible alumina; in case the treatment with gaseous acids is accidently carried out for too long, or in case too much gaseous acids are added, then it is not necessary to discard this alumina which can no longer be dispersed in water, but forms a gel, or to regenerate this product in a complicated manner, because a simple step of admixing untreated alumina again leads to the desired product which is easily dispersible in water. All aluminium hydroxides dispersible in acids can be used in the process according to the present invention; especially suitable are aluminium hydroxides of the Boehmite-type containing 65 to 85% by weight of $Al_2O_3$ having a bulk density of 500 to 700 grams per litre and a specific surface area (measured according to the Brunauer-Emmet-Teller method), of 140 to 300 m²/g and an average particle size of below 100um; whereby an aluminium hydroxide is especially suitable which is obtained by aqueous hydrolysis of a mixture of $C_4$–$C_{20}$ straight chain aluminium alcoholates obtained according to the ZIEGLER process and which complies with the above specification. Other typical examples of aluminium alcoholates are aluminium tributylate, aluminium tris (isobutylate) and aluminium tripropylate.

Unless otherwise indicated all parts and percentages are by weight. The invention is described in more detail in the following examples:

EXAMPLE 1

In a series of tests acid dispersible aluminium hydroxides were treated in a flask with 900 mg of gaseous HCl under high turbulence, whereby the amount of alumina hydrate (aluminium hydroxide) was varied to obtain different addition concentrations for the acid after the treatment. The concentration of the acids are, in the present example, calculated as content of chlorine. In all tests the dispersibility of the treated alumina in water was determined as well as the pH-value of a 10% dispersion; the values are listed in the following table 1:

TABLE 1

| Amount of alumina in g | Dispersibility of the treated alumina in H₂O | pH value of a 10% dispersion | Cl content after the treatment in % by weight |
| --- | --- | --- | --- |
| 20 | 99.1 | 3.8 | 3.6 |
| 30 | 98.7 | 3.8 | 2.8 |
| 40 | 98.5 | 3.9 | 2.3 |
| 50 | 96.9 | 4.0 | 1.8 |
| 60 | 83.3 | 4.0 | 1.5 |

The above table shows that when using a larger amount of alumina with 900 mg of chlorine, i.e., when having a lower addition concentration of chlorine, the dispersibility decreases. The table shows further that a dispersibility above 98.5% is obtained in the cases where the chlorine content after the treatment or the addition concentration is above about 2.5%.

The acid dispersible alumina-type which was employed corresponded to an aluminium hydroxide of the Boehmite-type having 75% by weight of $Al_2O_3$, a bulk density of 650 g/l and a specific surface (B.E.T.) of about 180 m²/g and an average particle size below 100 μm, which aluminium hydroxide has been obtained by hydrolysis of a mixture of $C_4$–$C_{20}$ straight chain alcoholates.

EXAMPLE 2

This experiment was carried out in a manner analogous to Example 1 but the chlorine was substituted by $NO_2$, which gaseous acid was fed into the alumina. A dispersibility of 95% was obtained when making a 20% dispersion by an addition concentration of 4.0% by weight $NO_2$.

EXAMPLE 3

For industrial production a fluidized bed reactor was used, whereby the acid dispersible alumina was fluidized with pressurized air above a filter plate bottom using an air pressure of 0.05 to 0.1 atmospheres above normal pressure atmospheres absolute. In the reactor there was 10 kg of acid dispersible aluminium hydroxide, namely a product of the Boehmite-type having 74% by weight of $Al_2O_3$, a bulk density of 620 g/l and a specific surface (B.E.T.) of 170 m²/g. A stream of 1.45 litres HCl were fed into the reactor per minute, whereby samples were taken after certain periods of time and the dispersibility in percent determined.

In a further test the amount of HCl was drastically increased; namely, up to 9.2 litres per minute; the results are set forth in following table 2.

Table 2

| Amount of HCl in liters/minute | Reaction time in minutes | Dispersability |
| --- | --- | --- |
| Test 1 | | |
| 1.45 | 30 | 26.0 |
| 1.45 | 60 | 48.3 |
| 1.45 | 70 | 54.3 |
| 1.45 | 90 | 68.3 |
| 1.45 | 120 | 89.2 |

Table 2-continued

| Amount of HCl in liters/minute | Reaction time in minutes | Dispersability |
| --- | --- | --- |
| 1.45 | 240 | 98.8 |
| Test 2 | | |
| 9.2 | 5 | 76.0 |
| 9.2 | 10 | 98.7 |
| 9.2 | 15 | 98.5 |
| 9.2 | 20 | 96.2 |
| 9.2 | 22 | Gel |

The above values show that the same favourable dispersability is obtained with a small amount of HCl, e.g. 1.45 liters per minute during a long reaction period compared with a large amount of hydrogen chloride during a short period of time. As a rule it is suitable for large - scale and continuous manufacture, to use larger amounts and shorter reaction times, for instance, with an amount of 9.2 liters HCl per minute and a reaction period of 10 minutes, whereby products with a dispersibility of about 99% are obtained.

The second series of tests shows that the dispersibility decreases when large amounts of about 9.2 liters HCl per minute and reaction periods exceeding about 15 minutes are used, namely, because the addition concentration exceeded the value of the addition concentration according to the process of the invention. For instance, after a period of more than 20 minutes a product is obtained which is no longer dispersible but forms a gel.

This gel forming product obtained after about 22 minutes was mixed with 10% of untreated alumina whereafter the total product again showed an excellent dispersibility.

The process can comprise, consist essentially of or consist of the steps set forth.

We claim

1. A process for making water dispersible aluminium hydroxide comprising contacting an acid dispersible Boehmite aluminium hydroxide powder having a content of 65 to 85 weight % of $Al_2O_3$ a bulk density of 500 to 700 g/l, a specific surface area by the B.E.T. procedure of 140 to 350 m²/g and an average particle size below 100 μm and which has been formed by the hydrolysis of an aluminium alcoholate with a gaseous acid at an addition concentration of about 1 to 9 weight %, said gaseous acid being hydrogen chloride $NO_2$, a mixture of $NO_2/N_2O_4$ or acetic acid vapor.

2. The process of claim 1 wherein the gaseous acid is used at an addition concentration of 3 to 5 weight %.

3. The process of claim 1 wherein the acid addition is carried out in a fluidized bed of the aluminium hydroxide.

4. The process of claim 1 carried out at room temperature and wherein the gaseous acid is hydrogen chloride.

5. The process of claim 4 wherein the acid addition concentration is 1.8 to 4.5 weight %.

6. The process of claim 5 wherein the acid addition concentration is 2.3 to 4.5 weight %.

7. The process of claim 6 wherein the acid addition concentration is 2.3 to 3.6 weight %.

8. The process of claim 1 carried out at room temperature and wherein the gaseous acid is $NO_2$.

9. The process of claim 8 wherein the acid addition concentration is 2.5 to 4.5 weight %.

10. The process of claim 1 wherein the aluminium hydroxide is treated with gaseous acid at a concentration in excess of about 9 weight % and there is added untreated aluminium hydroxide in an amount sufficient to reduce the concentration of acid to about 1 to 9 weight %.

11. The process of claim 10 carried out at room temperature and wherein the gaseous acid is hydrogen chloride or $NO_2$.

12. The process of claim 1 wherein the alcoholate is selected from the group consisting of aluminium tris (isobutylate), aluminium tripropylate, aluminium tributylate and a mixture of $C_4$-$C_{20}$ straight chain aluminium alcoholates.

13. The process of claim 12 wherein the alcoholate is a mixture of $C_4$–$C_{20}$ straight chain aluminium alcoholates.

14. The process of claim 1 carried out at a temperature of above 118° C and wherein the gaseous acid is acetic acid.

15. The process of claim 1 wherein the acid dispersible aluminium hydroxide is one which has been formed by the hydrolysis of an aluminium alcoholate and the process consists of treating said Boehmite with gaseous acid selected from the group consisting of hydrogen chloride, $NO_2$ and acetic acid vapor, the temperature being room temperature when the gaseous acid is hydrogen chloride or $NO_2$ and the temperature being above 118° C when the gaseous acid is acetic acid vapor.

* * * * *